US011218890B2

(12) United States Patent
Cizdziel et al.

(10) Patent No.: US 11,218,890 B2
(45) Date of Patent: Jan. 4, 2022

(54) BASIC SERVICE SET COLOR SELECTION

(71) Applicant: Cisco Technology, Inc., San Jose, CA (US)

(72) Inventors: Benjamin J. Cizdziel, San Jose, CA (US); Pooya Monajemi, Irvine, CA (US); Vishal S. Desai, San Jose, CA (US); Santosh B. Kulkarni, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 16/888,405

(22) Filed: May 29, 2020

(65) Prior Publication Data

US 2021/0144565 A1 May 13, 2021

Related U.S. Application Data

(60) Provisional application No. 62/934,973, filed on Nov. 13, 2019.

(51) Int. Cl.
*H04W 24/02* (2009.01)
*H04W 84/12* (2009.01)
*H04W 40/24* (2009.01)
*H04W 12/122* (2021.01)

(52) U.S. Cl.
CPC ......... *H04W 24/02* (2013.01); *H04W 12/122* (2021.01); *H04W 40/244* (2013.01); *H04W 84/12* (2013.01)

(58) Field of Classification Search
CPC . H04W 84/12; H04W 74/0816; H04W 24/02; H04W 28/06; H04W 88/08; H04W 74/002; H04W 16/14; H04W 74/08; H04W 76/11; H04W 16/18; H04W 28/0231; H04W 88/12; H04W 88/085; H04W 76/10; H04W 76/15; H04W 12/122; H04W 40/244
See application file for complete search history.

(56) References Cited

U.S. PATENT DOCUMENTS

| | | | |
|---|---|---|---|
| 9,949,317 B2 | 4/2018 | Huang et al. | |
| 10,244,543 B2 | 3/2019 | Cariou et al. | |
| 10,397,928 B1 | 8/2019 | Hahn et al. | |
| 2007/0286143 A1* | 12/2007 | Olson | H04W 12/12 370/338 |
| 2017/0085461 A1* | 3/2017 | Zhou | H04L 45/02 |

(Continued)

OTHER PUBLICATIONS

"Spatial Reuse Group Challenges" by Hedayat et al., dated Mar. 13, 2017 (Year: 2017).*

*Primary Examiner* — Daniel Lai
(74) *Attorney, Agent, or Firm* — Patterson + Sheridan, LLP

(57) ABSTRACT

Aspects described herein include an exclusionary approach for basic service set (BSS) color selection and assignment in a network. A network controller for a network selects a radio associated with an access point (AP) under management of the network controller and determines a potential set of BSS colors for the radio. The network controller then removes/ excludes a set of BSS colors that impacts the radio from the potential set of BSS colors and updates or assigns a BSS color for the selected radio using the potential set of BSS colors, minimizing the chances that the assigned BSS color will cause an overlapping BSS color condition in the network.

20 Claims, 7 Drawing Sheets

(56) References Cited

U.S. PATENT DOCUMENTS

| | | | |
|---|---|---|---|
| 2017/0359300 A1* | 12/2017 | Patil | .................... H04L 61/1541 |
| 2018/0020478 A1* | 1/2018 | Derham | ............ H04W 74/0808 |
| 2018/0110046 A1* | 4/2018 | Patil | ................. H04W 52/0219 |
| 2019/0082387 A1 | 3/2019 | Kim et al. | |
| 2019/0239232 A1 | 8/2019 | Zhou et al. | |
| 2019/0335486 A1* | 10/2019 | Patwardhan | ........ H04W 52/242 |
| 2019/0342891 A1* | 11/2019 | Asterjadhi | ............ H04W 84/12 |

* cited by examiner

BASIC SERVICE SET COLOR SELECTION

TECHNICAL FIELD

Embodiments presented in this disclosure generally relate to basic service set (BSS) color assignments in a wireless network. More specifically, embodiments disclosed herein provide for efficiently assigning or updating BSS colors for various network components in a managed network.

BACKGROUND

Wi-Fi 6 refers to the Institute of Electrical and Electronics Engineers (IEEE) specification 802.11ax, which is a developing wireless local area network (WLAN) specification in the IEEE 802.11 set of specifications. Wi-Fi 6 improves overall spectral efficiency, especially in dense deployment scenarios, which are becoming more and more common in WLAN deployments. To improve the system level performance and the efficient use of spectrum resources in dense deployment scenarios, the 802.11ax standard implements various spatial reuse techniques.

Devices in a Wi-Fi 6 network can identify if signals come from other (e.g., overlapping) BSSs and implement various mechanisms to reduce problems that arise in high density deployments. Doing so allows increased throughput opportunity via the spatial reuse features, and reduced power consumption due to devices dropping overlapping BSS packets early after deciphering only a PHY header of a frame. These improvements in Wi-Fi 6 are provided in part by a basic service set (BSS) coloring mechanism. However, the BSS coloring mechanism only achieves the goal of increased network throughput and efficiency if overlapping BSSs utilize different BSS colors. If the BSS colors are the same, client devices and other network components cannot quickly distinguish packets from different BSSs from each other, resulting in the loss of efficiency. While the 802.11ax standard defines basic rules for BSS coloring, it does not define a method to optimize BSS color assignments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
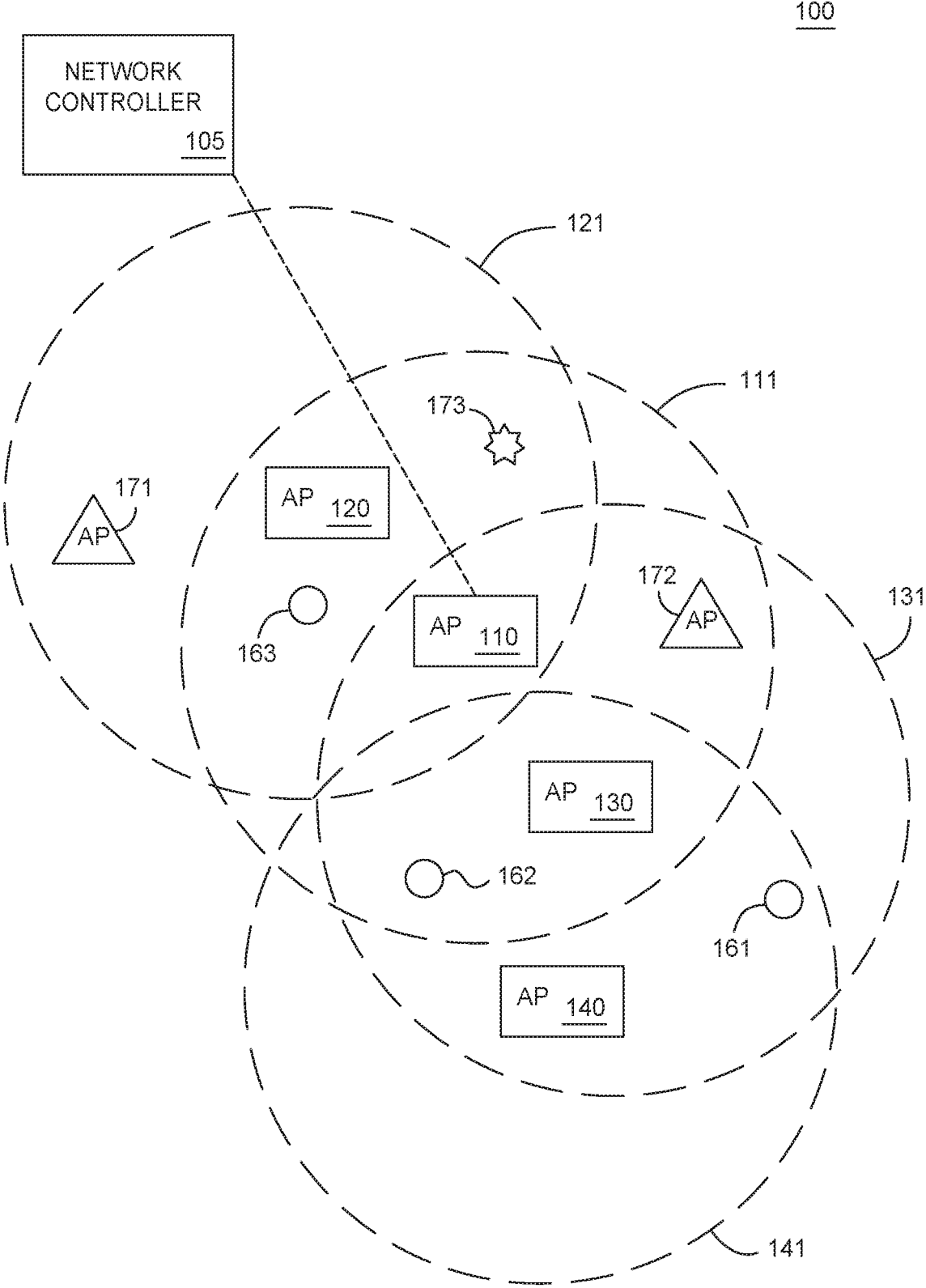
FIG. 1 illustrates a network, according to one embodiment described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method) including: selecting, at a network controller, a radio associated with a first access point (AP) of a set of access points (APs) under management of the network controller; determining a potential set of basic service set (BSS) colors for the radio; determining a plurality of BSS colors impacting the radio; excluding the plurality of BSS colors from the potential set of BSS colors; and updating an assigned BSS color for the radio using the potential set of BSS colors. Other embodiments of this aspect include corresponding computer systems, apparatus, and computer programs recorded on one or more computer storage devices, each configured to perform the actions of the methods.

One embodiment presented in this disclosure includes a system. The system includes: a processor, and a memory including instructions which, when executed on the processor, performs an operation, the operation including: selecting, at a network controller, a radio associated with a first access point (AP) of a set of access points (APs) under management of the network controller; determining a potential set of basic service set (BSS) colors for the radio; determining a plurality of BSS colors impacting the radio; excluding the plurality of BSS colors from the potential set of BSS colors; and updating an assigned BSS color for the radio using the potential set of BSS colors.

One embodiment presented in this disclosure includes a computer program product including a non-transitory computer-readable medium program having program instructions embodied therewith, the program instructions executable by a processor to perform an operation including: selecting, at a network controller, a radio associated with a first access point (AP) of a set of access points (APs) under management of the network controller; determining a potential set of basic service set (BSS) colors for the radio; determining a plurality of BSS colors impacting the radio; excluding the plurality of BSS colors from the potential set of BSS colors; and updating an assigned BSS color for the radio using the potential set of BSS colors.

EXAMPLE EMBODIMENTS

As described above, the 802.11ax specification (Wi-Fi 6) provides for increased overall spectral efficiency, such as in high density deployment schemes. These high density deployment schemes can be seen in both public areas (e.g., retail stores, parks, urban areas, etc.) and private spaces (e.g., enterprise networks, campus networks, data centers, etc.). To keep the various access points (APs) and connected devices/clients from wasting resources trying to prevent or react to interference, Wi-Fi 6 includes a BSS coloring mechanism to increase capacity in high-density WLAN networks.

Wi-Fi 6 devices (e.g., APs, client devices, etc. in a network) actively detect 802.11ax frames and check a BSS color field of each frame, where the BSS color is represented as a six bit integer. When the BSS color in the PHY header of a detected frame is the same color as the one that the Wi-Fi 6 device is currently assigned or associated with, then the Wi-Fi 6 device considers the detected frame as an intra-BSS frame.

In an example where the detected frame has a different BSS color than its own, the Wi-Fi 6 device considers the frame as an inter-BSS frame from an overlapping BSS (e.g., where one or more BSS areas overlap). In this case upon fulfilling overlapping BSS received energy requirements, the device treats the medium as busy only during the time it takes the device to validate that the detected frame is from an inter-BSS.

Optimal assignment of BSS colors in Wi-Fi 6 enabled high density networks provides improved performance in such networks. While the 802.11ax standard defines basic rules for BSS coloring, it does not define a method to optimize BSS color assignments.

The systems and methods described herein provide an exclusionary approach for BSS color selection and assignment for a network to minimize the chances of overlapping BSSs sharing the same BSS colors. A network controller selects a radio associated with an AP under management of the network controller and determines a potential set of BSS colors for the radio. The network controller then removes/excludes a set of BSS colors that may impact the radio from the potential set of BSS colors and updates or assigns a BSS color for the selected radio using the potential set of BSS colors, minimizing the chances that the assigned BSS color will cause an overlapping BSS color condition in the network.

FIG. 1 illustrates a network 100, according to one embodiment described herein. The network 100 includes a high density deployment of APs under management by a network controller 105. The network controller 105 controls or manages a plurality of APs including APs 110, 120, 130, and 140 (among other APs not shown in FIG. 1). While shown in direct communication with the AP 110 in FIG. 1 for ease of illustration, the network controller 105 is also in direct communication with each of the APs 120-140 such that a BSS color may be assigned for each of the APs' radios by the network controller 105.

The APs 110-140 include multiple radios (e.g., a 2.4 gigahertz (GHz) radio, a 5 GHz radio, etc.). In some examples, the multiple radios for an AP are each assigned a distinct BSS color as described herein. Further, each of the APs 110-140 also provide at least one BSS. For example, the AP 110 provides the BSS 111, AP 120 provides BSS 121, AP 130 provides BSS 131, and AP 140 provides BSS 141. The respective BSSs are established for the AP, which centralizes access and control over a group of wireless devices (such as the client devices described herein). The AP manages the wireless network within its BSS, advertises its own existence by broadcasting a Service Set Identifier (SSID), and provides network connection to the client devices within an area covered by its BSS. In some examples, the wireless coverage area of an AP is referred to as Basic Service Area (BSA) or cell. For ease of description the BSS and BSA associated with the various APs describe herein will be referred to collectively as a BSS (e.g., BSS 111).

The high density deployment of the APs in the network 100 results in overlapping coverage areas of the BSSs. For example, portions of BSS 111 overlap with each of the BSSs 121-141. This condition results in overlapping BSSs (OBSS) which can cause network performance issues without proper mechanisms such as BSS coloring to counteract the OBSS. In order to provide efficient network connections and reduce the impact of interference for the various connected devices in the network 100, efficient BSS coloring assignments need to be applied to each of the APs (and associated AP radios) and connected devices. The connected devices in the network 100 includes client devices 161-163. The client devices 162 and 163 are in the BSS 111 (i.e. in networked communication with the AP 110) and the client device 161 is in the BSS 131.

The network 100 also includes devices that are not under management or control of the network controller 105 such as a rogue APs 171 and 172. These rogue APs present a challenge for the network controller 105 in assigning BSS colors to the managed APs (e.g., APs 110-140), since the BSS color of the rogue APs cannot be assigned or updated by the network controller 105. Additionally, a rogue client 173 indicates overlapping BSS colors (OBSS colors) if one or more of the BSS areas (managed by the network controller 105) the rogue client 173 is within have the same BSS color as the rogue client 173. The assignment and updating of the APs 110-140 in order to provide BSS colors and prevent OBSS coloring is described in relation to FIGS. 2-4.

Figure 2A:
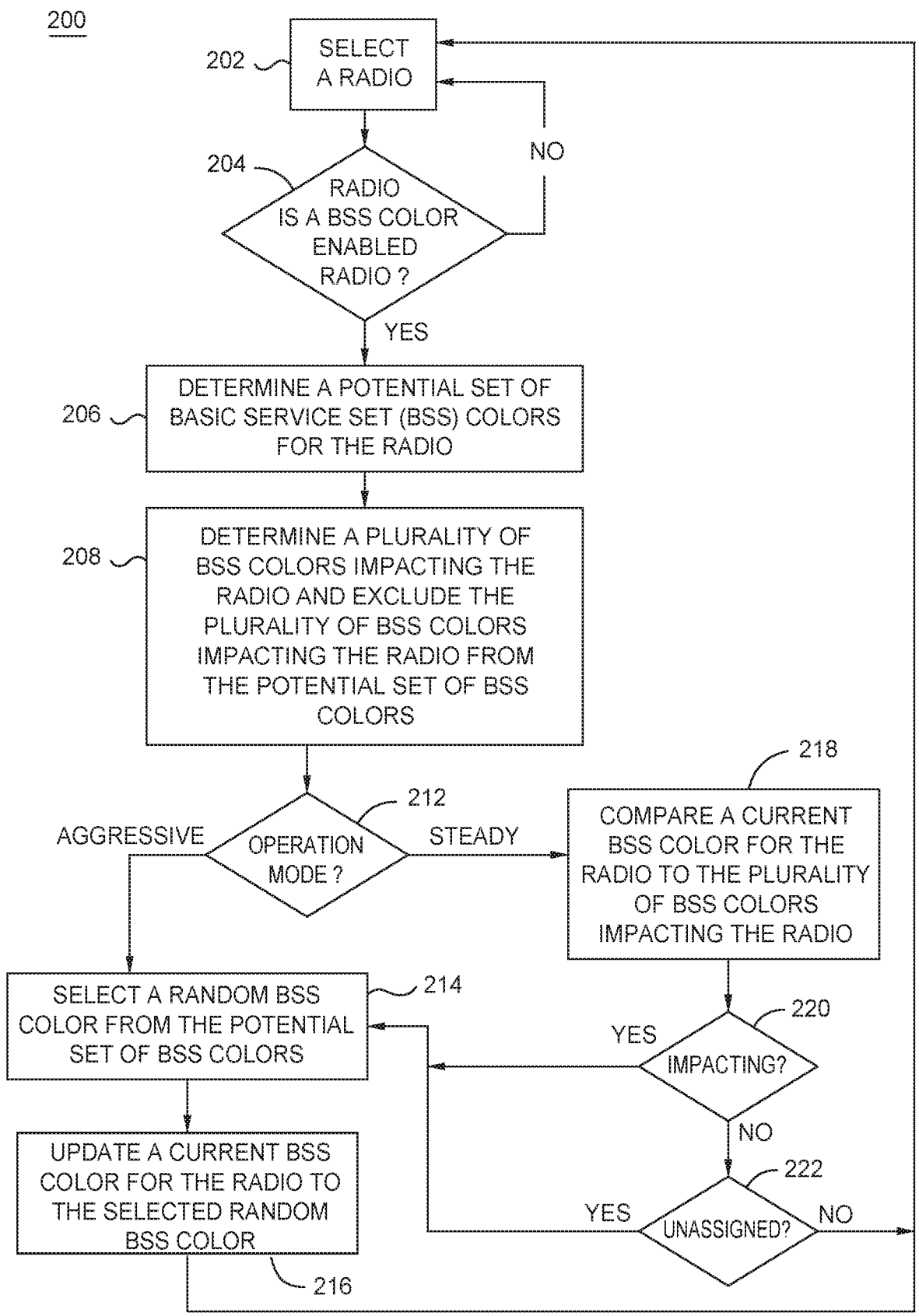
FIGS. 2A-2C are a method for Basic Service Set (BSS) color selection in a network, according to one embodiment described herein.
Figure 3:
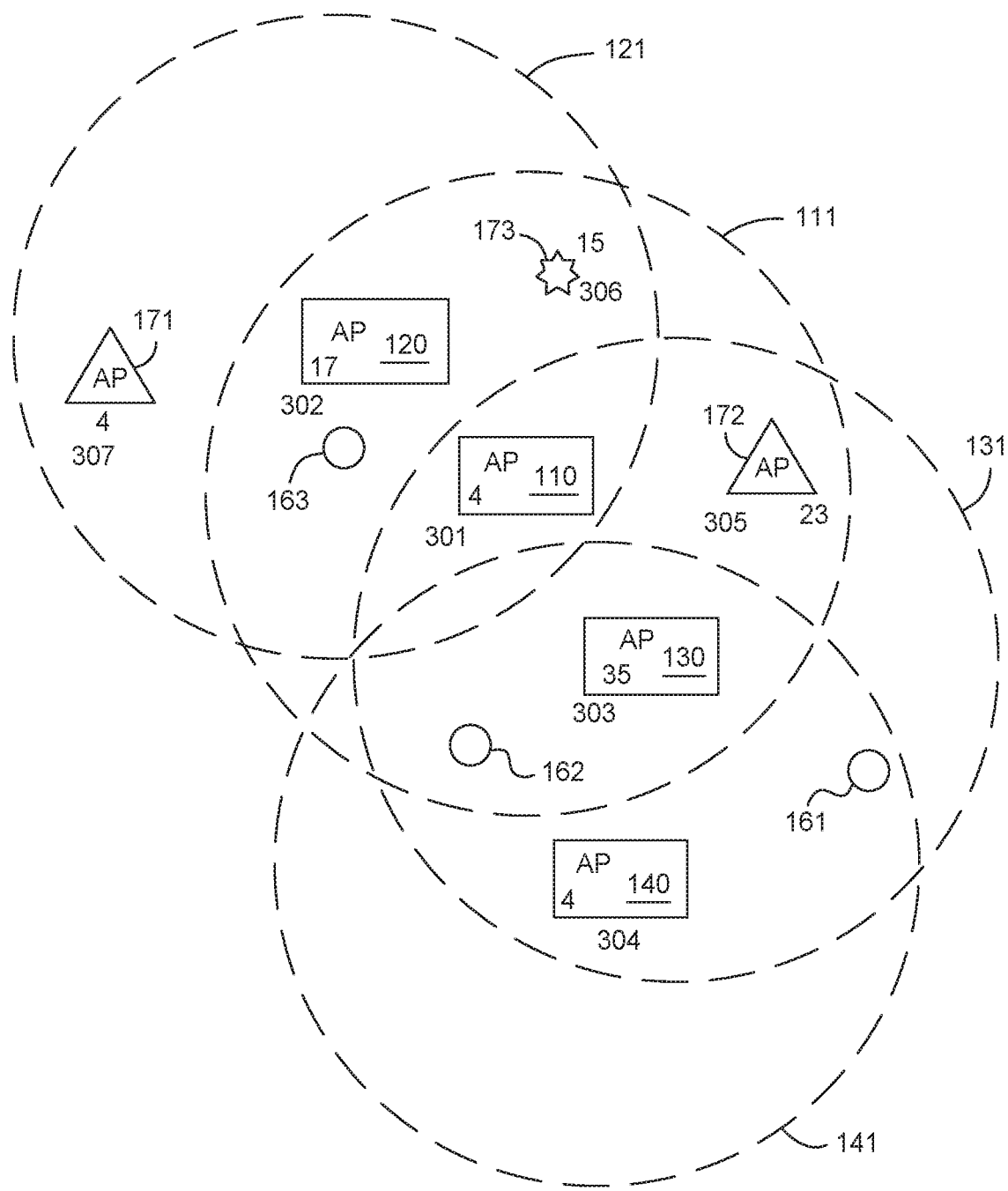
FIG. 3 illustrates a network deployment with BSS coloring, according to one embodiment described herein.

FIG. 2A is a method 200 for BSS color differentiation in a network, according to one embodiment described herein. For ease of discussion, reference will be made to FIGS. 3, 4A, and 4B in conjunction with the steps of the method 200. FIG. 3 illustrates the network 100 in a network deployment 300 where each of the APs and the associated BSS's have assigned BSS colors. For example, the AP 110 includes the BSS color 301 which is 4. The APs 120-140 have the BSS colors 302 (17), 303 (35) and 304 (4) respectively. As described in FIG. 1, the APs 110-140 are managed by the network controller 105. The rogue APs 171 and 172 are not managed by the network controller 105 and also have BSS colors 307 (4) and 305 (23). The rogue client 173 also includes an assigned BSS color 306 (15). In some examples, the rogue client 173 has a BSS color of a rogue AP (not shown) to which the rogue client 173 is connected.

In some examples, the method 200 is implemented in the network 100 at various times, such as when the network 100 is initiated, when the network hardware and/or software is updated, and/or when various BSS or other conflicts are detected. For example, the network controller 105 may detect the network deployment 300 includes one or more OBSS colors. For example, the AP 110 and its associated BSS color, BSS color 301 (4), are overlapping with other BSSs with the same color (e.g., the AP 140 has the BSS color 304 (4) which is the same as the BSS color 301 (4)). The OBSS colors can result in suboptimal performance for the APs and the client devices in the network 100, thus updated BSS color assignments are needed.

Method 200 begins at block 202, where a radio is selected by the network controller 105. For example, the network controller 105 selects the 5 GHz radio of the AP 110. In some examples, the network controller 105 process all of the same type of radios for the managed APs in the network 100 before selecting a different type of radio. For example, the network controller processes all of the 5 GHz radios at each AP in the network 100 that includes a 5 GHz radio, prior to selecting a different type of radio (e.g., 2.4 GHz).

At block 204, the network controller 105 determines the BSS color capability of the selected radio. When the selected radio is not BSS color enabled, the method 200 proceeds back to block 202 and a next radio in the network 100 is selected. For example, when a 5 GHz radio at the AP 110 is not BSS color enabled the network controller selects a next radio in the network (e.g., a 5 GHz radio at the AP 120). When every radio of the same type (e.g., all 5 GHz radios) has been selected and processed through the method 200 during an update/assignment event, the network controller determines that the network 100 has been updated to avoid OBSS coloring.

In an example where the selected radio is BSS color enabled, the method 200 proceeds to block 206. For example, the selected 5 GHz radio in the AP 110 is BSS color enabled and at block 206, the network controller 105 determines a potential set of BSS colors for the selected radio (stored as a potential BSS colors 523 described in relation to FIG. 5). In Wi-Fi 6, the available BSS colors include the values 1-63 inclusive. In some examples, the potential set includes every value 1-63. In some examples, various values may be excluded by the network controller 105 from the potential set of BSS colors. For example, the network controller 105 may exclude values already known to be assigned to other APs in the network 100 during a current update/assignment event. The network controller 105 may also exclude values set by a network manager for the network 100. These excluded values may be reserved for other networking purposes or known to likely cause conflict or OBSS colors in the network 100.

At block 208, the network controller 105 determines a plurality of BSS colors impacting the radio and excludes the plurality of BSS colors impacting the radio from the potential set of BSS colors. The plurality of BSS colors impacting the radio are determined and excluded from the potential set of BSS colors as described in relation to method 250 shown in FIG. 2B. The method described in the blocks 252-258 of FIG. 2B may be performed in any order. The order of proceeding through the various methods described herein is for ease of illustration.

Figure 2B:
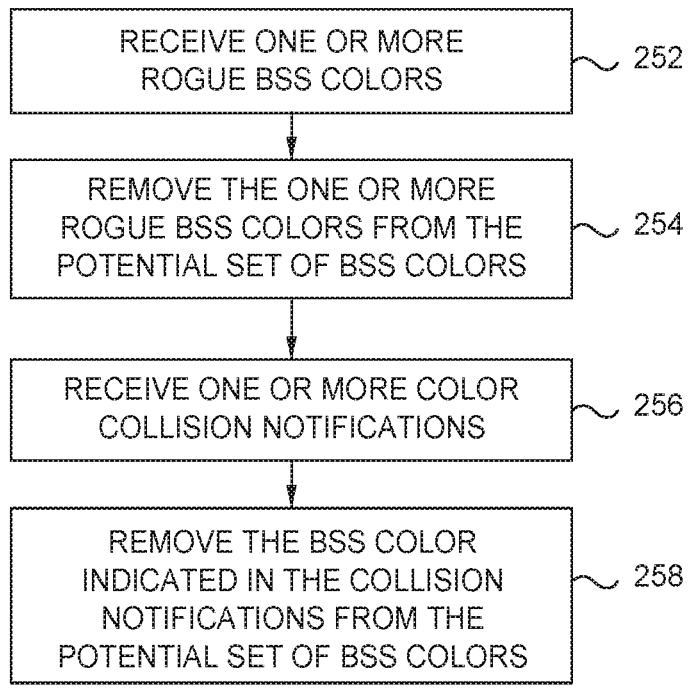
Figure 2C:
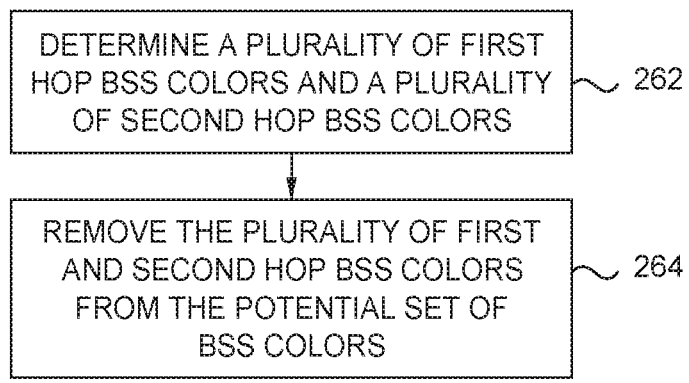

FIG. 2B illustrates a method for performing block 208 in FIG. 2A. At block 252, the network controller 105 receives one or more rogue BSS colors from the plurality of APs (e.g., APs 110-140). The rogue BSS colors include BSS colors associated with co-channel rogue BSSs or BSSs that are not managed by the network controller 105. Rogue BSSs sharing the same BSS color as an AP can cause interference and other network performance problems for managed BSSs of the same BSS color. In some examples, rogue APs and rogue clients are detected via managed APs (e.g., AP 110) and reported to the network controller 105. For example, the AP 110 deciphers the BSS color 305 of rogue AP 172 by observing management frames (which contain the BSS color in an information element) and/or the High Efficiency (HE) PHY header of data frames received at the AP 110 originating at the rogue AP 172. The detected BSS color 305 (23) is then reported to the network controller 105. In some examples, the AP 110 also detects the rogue client 173 and its associated BSS color, BSS color 306 (15) when data frames from the rogue client 173 are detected/received at the AP 110.

Other managed APs (e.g., APs 120-140) and/or active sensors (not shown) in the network 100 in communication with the network controller 105 can also detect co-channel rogue BSS devices not visible to the AP 110 but that may interfere with the AP or its associated clients. For example, the AP 120 detects and reports the rogue AP 171 and its associated BSS color, the BSS color 307 (4). While the rogue AP 171 is not detectable by the AP 110 (e.g. not within the BSS 111), the rogue AP 171 with the BSS color of 4 likely interferes or causes an OBSS color with the client device 163 in the BSS 111 and is reported to the network controller 105.

The network controller 105 updates the potential set of BSS colors to exclude the rogue BSS colors. At block 254, the network controller 105 removes the one or more rogue BSS colors from the potential set of BSS colors. In an example where no rogue BSS colors are detected in the network 100, no BSS colors are removed or excluded from the potential set of BSS colors at block 208. In the example shown in FIG. 3, the detected rogue BSS colors, detected via the AP 110 and the other APs, include BSS color 306 (15), BSS color 305 (23), and BSS color 307 (4). The BSS colors 15, 23, and 4 are removed from the potential set of BSS colors by the network controller 105. In some examples, the network controller 105 excludes the rogue BSS colors of rogue BSS devices that are in the vicinity of the currently selected AP radio's BSS (e.g., AP 110).

Blocks 256-258 detect and exclude/remove any BSS colors detected through collision notifications in the network 100. At block 256, the network controller 105 receives one or more color collision notifications. The one or more color collision notifications indicate that an overlapping BSS (OBSS) is operating with the same BSS color as whichever device generates the color collision notification. The selected AP's current BSS color (e.g., the BSS color 301 (4) for the AP 110) is excluded/removed from its next color assignment (e.g., removed from the potential set of BSS colors) upon detection of a BSS color collision (i.e., when an OBSS has the same BSS color). In some examples, detection of a color collision prompts an immediate color change instead of waiting for a next scheduled interval (e.g., the AP's current color is added to the plurality of BSS colors impacting the radio and removed from the potential set of BSS colors). A color collision may be detected by either client devices or managed APs in the network 100.

The 802.11ax standard defines a mechanism for Wi-Fi 6 connected clients to send an event packet/color collision report to the AP when a BSS color collision is detected. For example, the client device 163 receives an OBSS packet with the same BSS color (4) as its own BSS (e.g., BSS 111) and sends an event packet reporting a color collision. For example, the client device 163 in the BSS 111 with the BSS color 301 (4) generates a collision notification when management or data frames (or other communication) from the rogue AP 171 are received at the client device 163. The managed APs may also generate collision notifications. In some examples, the managed AP (e.g., AP 110 for client device 163) receives a collision notification from a client and reports the received notification to the network controller along with any collision notifications generated by the AP itself.

In some examples, in response to receiving a color collision event packet/color collision report from a connected client device, the AP 110 solicits a beacon report from the client device 163 (e.g., sends a report solicitation). The beacon report received from the client device 163 provides additional insight on which APs from which the client receives transmissions, which may assist the network controller 105 in determining which of the managed APs in the network 100 caused the color collision. The network controller 105 ensures that the conflicting APs have a different color in the next color assignment. When the conflicting AP (of the BSS that caused the color collision) is not managed by the network controller 105, the network controller determines the collision is caused by a rogue BSS. In some examples, the beacon report frame generated by the client also includes the BSS color of each reported basic service set identifier (BSSID), which when reported to the network controller 105 allows the network controller to more easily determine which BSS is causing the collision.

In another example, the client device 162 also generates and reports a color collision (caused by the AP 140 and the BSS color 304 (4)) to the AP 110. The AP 110 solicits a beacon report from the client device 162 which includes the BSSID and the BSS color 304 (4) of the AP 140, which the network controller uses to identify the AP 140 as the cause of the collision. The network controller 105 uses this information to ensure that the AP 110 and the AP 140 do not share a BSS color in an updated BSS color assignment.

Wi-Fi 6 APs can also detect and report color collisions. For example, the AP 110 detects a color collision by observing the BSS color contained in packet frames, management frames and/or the HE PHY header of data frames from other co-channel BSSs. In one example, the AP identifies and reports the BSSID and Received Signal Strength Indicator (RSSI) of the OBSS packet that caused the color collision, in addition to the conflicting BSS color in the color collision report. This information is also reported to the network controller 105 which may use it to determine which BSS is causing the detected collision and the collision interference severity. In some examples, the network controller 105 determines one or more actions based on this information to remedy the collision during a next color assignment.

The network controller updates the potential set of BSS colors to exclude the BSS colors indicated in the color collision notification. At block 258, the network controller 105 removes the BSS color of any overlapping BSS (OBSS) that operates with the same BSS color as whichever device generated the color collision notification. For example, the BSS color value 4, from BSS colors 307 and 304, is removed from the potential set of BSS colors for the AP 110.

At block 212, the network controller begins a process to update an assigned BSS color for the radio using the potential set of BSS colors. For example, the network controller 105 will update the BSS color 301 (4) for the AP 110. In some examples, updating the BSS color for the radio includes determining an operation mode at block 212. The operation mode may include a steady-state operation mode or an aggressive operation mode for the network 100. In some examples, the steady-state mode is a default mode of operation for a high density network such as the network 100. In the steady-state mode, the network controller 105 causes the least network disruption by changing a BSS color for an AP or selected radio only when necessary. For example, an AP or selected radio's color is updated or reassigned only if its currently assigned color is excluded from the potential set of BSS colors for the radio.

In contrast, the aggressive mode is implemented by the network controller 105 to update each of the APs in the network. For example, a large change in the network 100 (e.g., a software update, a controller group membership change, etc.) causes the network controller 105 to use the aggressive operation mode to update the BSS colors in the network 100. In one example of aggressive operation mode, every managed AP's associated radio's BSS color is reassigned, and a neighboring AP's BSS color is excluded from the potential set of BSS colors only if that neighboring AP has already had its BSS color assigned on the current run of the method 200. In this example, a neighboring AP that has not had its color assigned in the current run yet will get its color reassigned when processed by the network controller 105 such that its current color does not need to be excluded.

In some examples, the plurality of BSS colors impacting the radio is updated based on the determination at block 212. For example, as described in method 260 of FIG. 2C, the network controller at blocks 262-264 detect and exclude/remove any BSS colors associated with first and second hop co-channel frequency neighbor APs of the AP associated with the selected radio. At block 262, the network controller 105 determines a plurality of first hop BSS colors for the first AP and a plurality of second hop BSS colors for the first AP (e.g. AP 110). The BSS colors of AP 110's first hop (e.g., other managed APs in range of the AP 110) and second hop (e.g., other managed APs in range of the AP 110's first hop neighbors) co-channel neighbors are determined in order to reduce the chance of OBSSs causing color collisions. The neighbor relationships between the managed APs may be determined using a neighbor discovery protocol (NDP) or other mechanism.

The first hop co-channel neighbors of the AP 110 (e.g., APs 120 and 130 which are in range of the AP 110) are most likely to cause color collisions due to OBSS in high density deployments. Second hop co-channel neighbors (e.g., a neighbor of any of the AP's first hop neighbors that shares the same channel as the AP) can also cause OBSS color collisions. For example, the AP 110 does not hear the second hop co-channel neighbor represented by the AP 140 directly, but its first hop co-channel neighbor, the AP 130, is within range of the AP 140 and the AP 140 creates an OBSS with the AP 110's BSS, the BSS 111 (e.g., the BSS 111's client device, the client device 162 is in range of AP 140). As described above, when the network is in aggressive mode, at block 264, the network controller 105 removes the plurality of first hop BSS colors and the plurality of second hop BSS colors from the potential set of BSS colors, wherein the pluralities of first and second hop BSS colors only include neighbors' colors that have already been assigned by the network controller during the current run of the method 200 and neighbors' colors that are statically assigned (e.g., not changeable or manually assigned by a user, etc.). In another example, when the network is in steady state mode, at block 264, the network controller 105 removes the plurality of first hop BSS colors and the plurality of second hop BSS colors from the potential set of BSS colors, wherein the pluralities of first and second hop BSS colors include all neighbors' colors. For the AP 110, the BSS colors 302 (17), 303 (35) and 304 (4) are removed from the potential set of BSS colors.

Figure 4A:
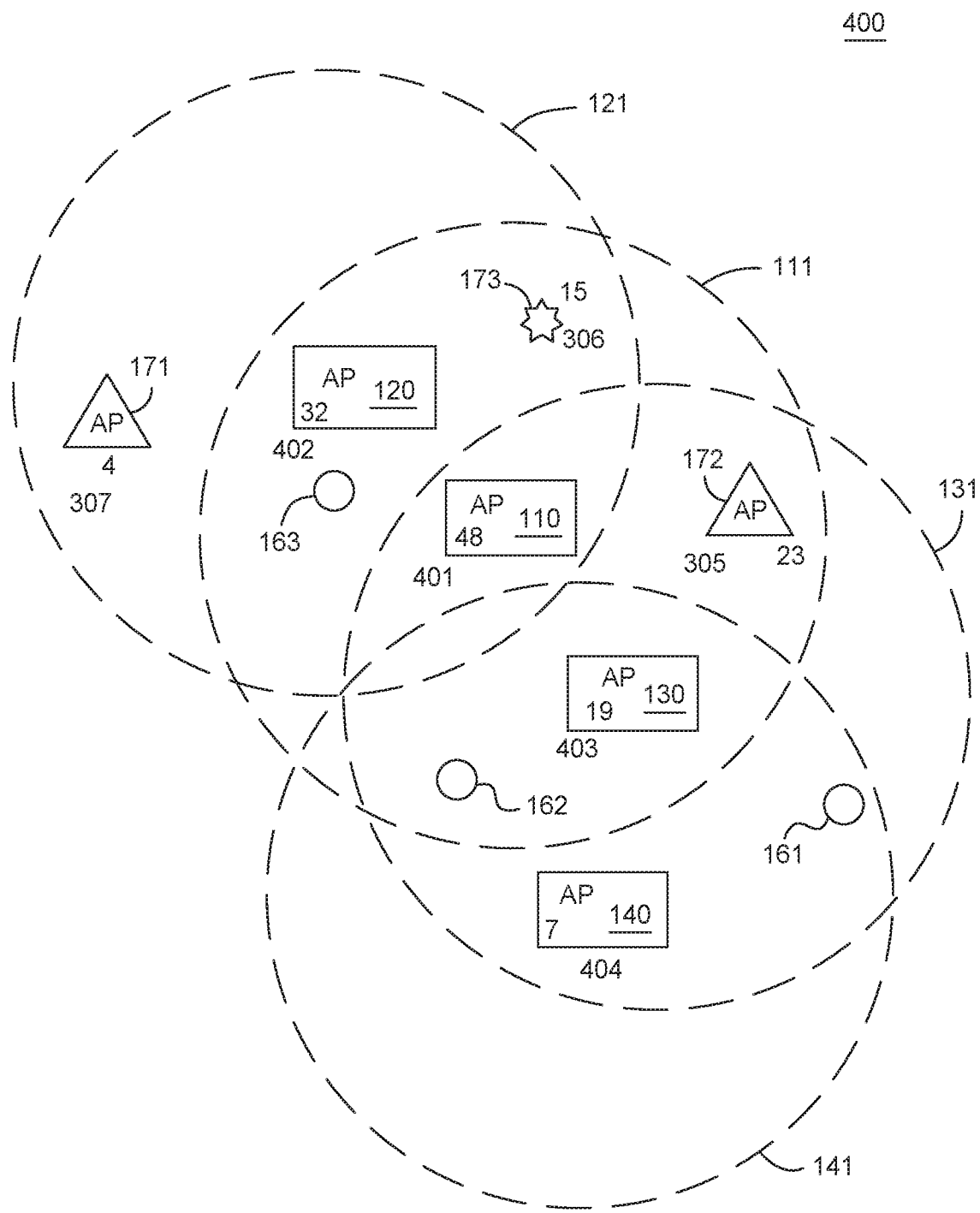
FIG. 4A illustrates a network deployment with BSS coloring updated in an aggressive mode, according to one embodiment described herein.

Returning back to FIG. 2A, in an example where the operation mode is in the aggressive operation mode, method 200 proceeds to block 214, where the network controller 105 selects a random BSS color from the potential set of BSS colors and at block 216, the network controller 105 updates the selected radio's current BSS color to the randomly selected BSS color. In some examples, the random selection provides an additional level of robustness in color differentiation between BSSs, which can help when the network controller 105 has not yet picked up recent changes in the network. FIG. 4A illustrates a network deployment 400 with BSS coloring updated in an aggressive mode. As shown the BSS color 301 (4) for the AP 110 has been updated to the randomly selected BSS color 401 (48). For the network deployment 400, the BSS colors for the other managed APs (e.g., APs 120-140) are also updated/reassigned. For example, the BSS color 302 (17) is updated to BSS color 402 (32), the BSS color 303 (35) is updated to BSS color 403 (19), and the BSS color 304 (4) is updated to BSS color 404 (7).

In an example, where the operation mode is in the steady-state operation mode, method 200 proceeds to block 218 where the network controller compares a current BSS color for the radio to the plurality of BSS colors impacting the radio. For example, the network controller compares the BSS color 301 (4) of the AP 110 to the various determined impacting colors (e.g., BSS colors 302, 307, 306, 303, 305, 304, etc.).

At block 220, the network controller determines from the comparison if the comparison indicates the current BSS color is included in the plurality of BSS colors impacting the radio. In the example, where the current BSS color is not included in the plurality of BSS colors impacting the radio, method 200 proceeds to block 222.

Figure 4B:
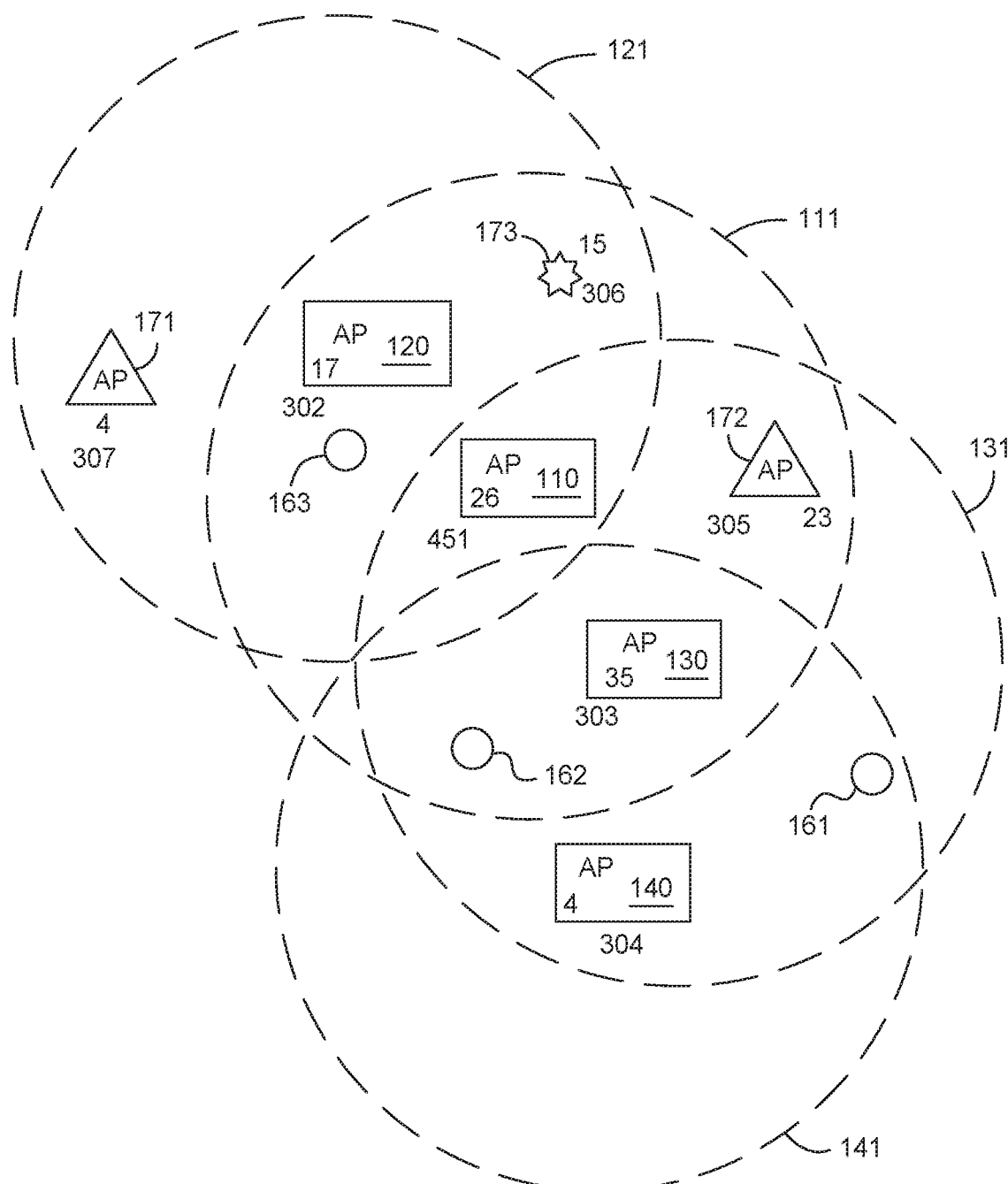
FIG. 4B illustrates a network deployment with BSS coloring updated in a steady-state mode, according to one embodiment described herein.

At block 222, the network controller 105 determines if the current BSS color is unassigned. For example, for the AP 130, the current BSS color in FIG. 3 (the BSS color 303 (35)) is assigned and is also not in the plurality of BSS colors impacting a radio associated with the AP 130 as shown in FIG. 3. Since the network 100 is in the steady-state operation mode, the network controller 105 does not change the BSS color 303 (35) as shown in FIG. 4B which illustrates a network deployment with BSS coloring updated in a steady-state mode, and method 200 proceeds back to block 202 (where the next radio is selected).

In an example where the selected radio's BSS color is unassigned, method 200 proceeds from block 222 to block 214. Likewise, in an example where the comparison at block 220 indicates the current BSS color is included in the plurality of BSS colors impacting the radio, method 200 proceeds to block 214. At block 214, the network controller 105 selects a random BSS color from the potential set of BSS colors and at block 216, the network controller 105 updates the current BSS color to the randomly selected BSS color. After block 216, method 200 proceeds back to block 202 (where the next radio is selected). Returning back to FIG. 4B, the comparison for the AP 110 indicates that the BSS color 301 (4) is included the plurality of BSS colors impacting the radio and is updated/assigned a random color by the network controller such as the BSS color 451 (26). In the network deployment 450, the other managed APs (120-140) do not have their respective BSS colors updated since the network is in a steady state mode operation and the respective BSS colors are not in conflict with other BSS colors in the network 100 as shown in FIG. 3 (AP 140's BSS color 304 (4) is not updated despite it sharing the same BSS color as AP 110 in FIG. 3 because in this example, method 200 is performed on AP 110 first, so AP 110's BSS color is already updated to a different color 451 (26)). When every radio of the same type (e.g., all 5 GHz radios) has been selected and processed through the method 200 during an update/assignment event, the network controller 105 determines that the network 100 has been updated to avoid OBSS coloring.

Figure 5:
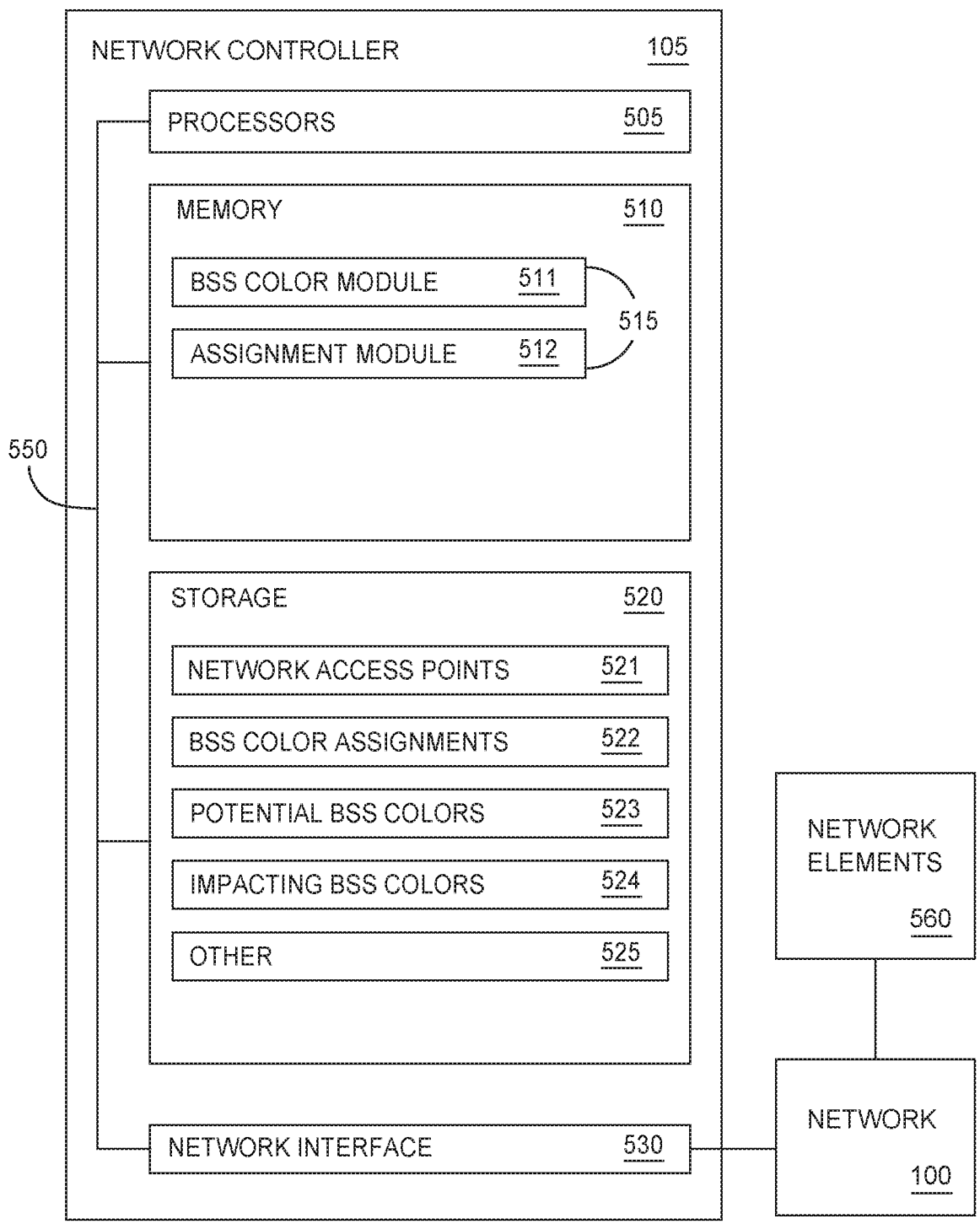
FIG. 5 is a block diagram of a network controller, according to one embodiment described herein.

FIG. 5 depicts a network controller 105, according to one embodiment described herein. The network controller 105 is shown in the form of a general-purpose computing device, but may include a server and/or application executing on a cloud network. The components of network controller 105 may include, but are not limited to, one or more processing units or processors 505, a memory 510, a storage system 520, network interface 530 connecting the network controller 105 to the network 100 and other network elements 560, and a bus 550 that couples various system components including the memory 510 and storage system 520 to processors 505 along with various input/output components (not shown). In other embodiments, the network controller 105 is distributed and includes a plurality of discrete computing devices that are connected through wired or wireless networking.

Bus 550 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The network controller 105 typically includes a variety of computer system readable media. Such media may be any available media that is accessible by the network controller 105, and it includes both volatile and non-volatile media, removable and non-removable media.

Memory 510 can include computer system readable media in the form of volatile memory, such as random access memory (RAM) and/or cache memory. The network controller 105 may further include other removable/non-removable, volatile/non-volatile computer system storage media. By way of example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 550 by one or more data media interfaces. As will be further depicted and described below, memory 510 may include at least one program product having a set (e.g., at least one) of program modules that are configured to carry out the functions of various embodiments described herein.

The network controller 105 may further include other removable/non-removable, volatile/non-volatile computer system storage media. In some examples, storage system 520 may be included as part of memory 510 and may typically provide a non-volatile memory for the networked computing devices, and may include one or more different storage elements such as Flash memory, a hard disk drive, a solid state drive, an optical storage device, and/or a magnetic storage device. For example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage system 520 may include media for a list of managed network access points 521, BSS color assignments 522, potential BSS colors 523, impacting BSS colors 524, and other information 525 stored for access and use by the network controller 105.

Memory 510 may include a plurality of modules 515 for performing various functions described herein. The modules 515 generally include program code that is executable by one or more of the processors 505. As shown, modules 515 include the BSS color module 511 and assignment module 512. The modules 515 may also interact with each other and storage system 520 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
    selecting, at a network controller, a radio associated with a first access point (AP) of a set of access points (APs) under management of the network controller;
    determining a potential set of basic service set (BSS) colors for the radio;
    determining a plurality of BSS colors impacting the radio on a same channel;
    excluding the plurality of BSS colors impacting the radio from the potential set of BSS colors; and
    updating an assigned BSS color for the radio using the potential set of BSS colors.
2. The method of claim 1, wherein determining the plurality of BSS colors impacting the radio comprises:

receiving one or more rogue BSS colors from the set of APs, wherein the rogue BSS colors are associated with devices not managed by the network controller; and wherein excluding the plurality of BSS colors from the potential set of BSS colors comprises:

removing the one or more rogue BSS colors from the potential set of BSS colors.

3. The method of claim 1, wherein determining the plurality of BSS colors impacting the radio comprises:

receiving one or more color collision notifications, wherein the one or more color collision notifications indicate an overlapping BSS (OBSS) comprises a same BSS color as a current BSS color for the radio; and wherein excluding the plurality of BSS colors from the potential set of BSS colors comprises:

removing the same BSS color from the potential set of BSS colors.

4. The method of claim 3, wherein the one or more color collision notifications comprises at least one color collision report received from a connected client device at the first AP.

5. The method of claim 4, wherein the one or more color collision notifications comprises at least one beacon report received from the connected client device at the first AP, wherein the at least one beacon report is sent to the first AP in response to a solicitation for the at least one beacon report from the first AP to the connected client device, wherein the at least one beacon report comprises a BSS color of each reported basic service set identifier detected at the connected client device.

6. The method of claim 3, wherein the one or more color collision notifications comprises at least one color collision report generated by the first AP upon observing the same BSS color contained in one or more packet frames from one or more co-channel BSSs, wherein the at least one color collision report identifies a basic service set identifier and received signal strength indicator for an OBSS causing a color collision.

7. The method of claim 1, wherein determining the plurality of BSS colors impacting the radio comprises:

determining at the network controller a plurality of first hop BSS colors for the first AP and a plurality of second hop BSS colors for the first AP, wherein the plurality of first hop BSS colors and the plurality of second hop BSS colors correspond to BSS colors assigned to APs from the set of APs that are first hop and second hop co-channel radio frequency neighbors of the first AP respectively; and wherein excluding the plurality of BSS colors from the potential set of BSS colors comprises:

removing the plurality of first hop BSS colors and the plurality of second hop BSS colors from the potential set of BSS colors.

8. The method of claim 7, further comprising:

determining an operation mode for the set of APs, wherein when the operation mode is an aggressive mode, the pluralities of first hop and second hop BSS colors comprise BSS colors that have already been assigned by the network controller during a current assignment iteration and BSS colors that are statically assigned.

9. The method of claim 1, wherein the method further comprises:

determining an operation mode for the set of APs;

wherein when the operation mode is a steady-state mode, updating the assigned BSS color for the radio using the potential set of BSS colors comprises:

determining when a current BSS color is unassigned; and wherein when the current BSS color is unassigned, selecting a second random BSS color from the potential set of BSS colors; and updating the current BSS color to the second random BSS color; and wherein when the current BSS color is not unassigned, comparing the current BSS color for the radio to the plurality of BSS colors impacting the radio;

wherein when the comparison indicates the current BSS color is included in the plurality of BSS colors impacting the radio:

selecting a first random BSS color from the potential set of BSS colors; and updating the current BSS color to the first random BSS color; and wherein when the operation mode is an aggressive mode, updating the assigned BSS color for the radio using the potential set of BSS colors comprises:

selecting a third random BSS color from the potential set of BSS colors; and updating the current BSS color to the third random BSS color.

10. A system, comprising:

a processor; and a memory comprising instructions which, when executed on the processor, performs an operation, the operation comprising:

selecting, at a network controller, a radio associated with a first access point (AP) of a set of access points (APs) under management of the network controller;

determining a potential set of basic service set (BSS) colors for the radio;

determining a plurality of BSS colors impacting the radio on a same channel;

excluding the plurality of BSS colors impacting the radio from the potential set of BSS colors; and updating an assigned BSS color for the radio using the potential set of BSS colors.

11. The system of claim 10, wherein determining the plurality of BSS colors impacting the radio comprises:

receiving one or more rogue BSS colors from the set of APs, wherein the rogue BSS colors are associated with devices not managed by the network controller; and wherein excluding the plurality of BSS colors from the potential set of BSS colors comprises:

removing the one or more rogue BSS colors from the potential set of BSS colors.

12. The system of claim 10, wherein determining the plurality of BSS colors impacting the radio comprises:

receiving via the first AP, one or more color collision notifications, wherein the one or more color collision notifications indicate an overlapping BSS (OBSS) comprises a same BSS color as a current BSS color for the radio; and wherein excluding the plurality of BSS colors from the potential set of BSS colors comprises:

removing the same BSS color from the potential set of BSS colors.

13. The system of claim 12, wherein the one or more color collision notifications comprises at least one color collision report received from a connected client device at the first AP.

14. The system of claim 13, wherein the one or more color collision notifications comprises at least one beacon report received from the connected client device at the first AP, wherein the at least one beacon report is sent to the first AP in response to a solicitation for the at least one beacon report from the first AP to the connected client device, wherein the at least one beacon report comprises a BSS color of each reported basic service set identifier detected at the connected client device.

15. The system of claim 12, wherein the one or more color collision notifications comprises at least one color collision report generated by the first AP upon observing the same BSS color contained in one or more packet frames from one or more co-channel BSSs, wherein the at least one color collision report identifies a basic service set identifier and received signal strength indicator for an OBSS causing a color collision.

16. The system of claim 10, wherein determining the plurality of BSS colors impacting the radio comprises:
    determining at the network controller a plurality of first hop BSS colors for the first AP and a plurality of second hop BSS colors for the first AP, wherein the plurality of first hop BSS colors and the plurality of second hop BSS colors correspond to BSS colors assigned to APs from the set of APs that are first hop and second hop co-channel radio frequency neighbors of the first AP respectively; and
    wherein excluding the plurality of BSS colors from the potential set of BSS colors comprises:
    removing the plurality of first hop BSS colors and the plurality of second hop BSS colors from the potential set of BSS colors.

17. The system of claim 16, wherein the operation further comprises:
    determining an operation mode for the set of APs, wherein when the operation mode is an aggressive mode, the pluralities of first hop and second hop BSS colors comprise BSS colors that have already been assigned by the network controller during a current assignment iteration and BSS colors that are statically assigned.

18. The system of claim 10, wherein the operation further comprises:
    determining an operation mode for the set of APs;
    wherein when the operation mode is a steady-state mode, updating the assigned BSS color for the radio using the potential set of BSS colors comprises:
        determining when a current BSS color is unassigned; and
        wherein when the current BSS color is unassigned, selecting a second random BSS color from the potential set of BSS colors; and
        updating the current BSS color to the second random BSS color; and
    wherein when the current BSS color is not unassigned, comparing the current BSS color for the radio to the plurality of BSS colors impacting the radio;
        wherein when the comparison indicates the current BSS color is included in the plurality of BSS colors impacting the radio:
            selecting a first random BSS color from the potential set of BSS colors; and
            updating the current BSS color to the first random BSS color; and
    wherein when the operation mode is an aggressive mode, updating the assigned BSS color for the radio using the potential set of BSS colors comprises:
    selecting a third random BSS color from the potential set of BSS colors; and
    updating the current BSS color to the third random BSS color.

19. A computer program product comprising a non-transitory computer-readable medium program having program instructions embodied therewith, the program instructions executable by a processor to perform an operation comprising:
    selecting, at a network controller, a radio associated with a first access point (AP) of a set of access points (APs) under management of the network controller;
    determining a potential set of basic service set (BSS) colors for the radio;
    determining a plurality of BSS colors impacting the radio on a same channel;
    excluding the plurality of BSS colors impacting the radio from the potential set of BSS colors; and
    updating an assigned BSS color for the radio using the potential set of BSS colors.

20. The computer program product of claim 19, wherein determining the plurality of BSS colors impacting the radio comprises:
    receiving one or more rogue BSS colors from the set of APs, wherein the rogue BSS colors are associated with devices not managed by the network controller; and
    wherein excluding the plurality of BSS colors from the potential set of BSS colors comprises:
    removing the one or more rogue BSS colors from the potential set of BSS colors.

* * * * *